(12) United States Patent
Cho et al.

(10) Patent No.: US 7,970,572 B2
(45) Date of Patent: Jun. 28, 2011

(54) METHOD OF DETECTING FREE FALL AND APPARATUS TO DETECT FREE FALL USING THE METHOD

(75) Inventors: Kyu-nam Cho, Seoul (KR); Jun-Seok Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 12/331,641

(22) Filed: Dec. 10, 2008

(65) Prior Publication Data

US 2009/0171617 A1  Jul. 2, 2009

(30) Foreign Application Priority Data

Dec. 27, 2007 (KR) .................. 10-2007-0138605

(51) Int. Cl.
*G01P 15/00* (2006.01)
(52) U.S. Cl. ........ 702/141; 702/108; 702/113; 702/127; 702/142; 702/189
(58) Field of Classification Search .................. 702/108, 702/113, 127, 141, 142, 189
See application file for complete search history.

(56) References Cited

U.S. PATENT DOCUMENTS

2007/0225947 A1* 9/2007 Suzuki .................. 702/189

FOREIGN PATENT DOCUMENTS

| JP | 2002-100180 | 4/2002 |
|---|---|---|
| JP | 2002-208239 | 7/2002 |
| JP | 2005-346840 | 12/2005 |
| KR | 2006-0022020 | 3/2006 |
| KR | 10-699898 | 3/2007 |

* cited by examiner

*Primary Examiner* — Sujoy K Kundu
(74) *Attorney, Agent, or Firm* — Stanzione & Kim, LLP

(57) ABSTRACT

A method of detecting a free fall of a device includes measuring an acceleration of the device, calculating an integral of the acceleration, and determining whether the acceleration is periodic. If the acceleration is not periodic, the integral of the acceleration is compared with a first critical value to determine whether the device falls freely. If the acceleration is periodic, the integral of the acceleration is compared with a second critical value to determine whether the device falls freely. The first and second critical values are different. Since whether the device is periodically accelerated is considered, free fall of the device can be correctly detected, and thus malfunction of the device can be prevented. For example, an unnecessary protection operation for a hard disk drive of the device can be prevented, and thus a user can conveniently use the device.

17 Claims, 5 Drawing Sheets

US 7,970,572 B2

METHOD OF DETECTING FREE FALL AND APPARATUS TO DETECT FREE FALL USING THE METHOD

CROSS-REFERENCE TO RELATED APPLICATIONS

This application claims priority under 35 U.S.C. §119(a) from Korean Patent Application No. 10-2007-0138605, filed on Dec. 27, 2007, in the Korean Intellectual Property Office, the disclosure of which is incorporated herein in its entirety by reference.

BACKGROUND

1. Field of the Invention

The present general inventive concept relates to a method of detecting free fall, and more particularly, to a method of detecting free fall of a device based on whether the device is periodically accelerated, and an apparatus to detect free fall using the method.

2. Description of the Related Art

Mobile devices, such as cellular phones, personal digital assistants (PDAs), digital cameras, electronic home appliances, and electronic office devices, have become necessities. Mobile devices or storage devices of the mobile devices such as a hard disk drive should be protected from a free fall shock. For example, when a mobile device falls freely, a hard disk drive of the mobile device can be protected by detecting the free fall of the mobile device and parking the head of the hard disk device at a safe position.

In a conventional free fall detecting method, a determination is made that a mobile device falls freely when acceleration of the mobile device is maintained below a predetermined level for a predetermined time. Then, a read/write head of a hard disk drive of the mobile device is moved to a safe region for protecting the read/write head from free fall shocks. That is, the acceleration of the mobile device is monitored, and when the monitored acceleration of the mobile device is kept smaller than a predetermined critical value for a predetermined time, a determination is made that the mobile device falls freely. Conventional methods of detecting free fall of a mobile device for protecting a hard disk drive of the mobile device have been disclosed in articles such as Japanese Patent Laid-Open Publication No. 2005-346840.

However, in the conventional free fall detecting methods, non-free-fall movements (e.g., accelerated or decelerated movements) of a mobile device can be detected as free fall of the mobile device. For example, when a user with a mobile device walks or runs, since the mobile device does not fall freely, a protection operation is not required for the mobile device. However, according to the conventional methods, an erroneous conclusion that the mobile device falls freely can be made. As a result, an unnecessary operation can be performed for protecting a hard disk drive of the mobile device, and thus a user may experience inconvenience due to the unnecessary operation.

SUMMARY

The present general inventive concept provides a method of exactly detecting free fall of a device based on whether the device is periodically accelerated so as to prevent malfunction of the device.

The present general inventive concept also provides an apparatus to detect free fall using the method.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of detecting a free fall of a device, the method including measuring an acceleration of the device, calculating an integral of the acceleration of the device with respect to time, and determining whether the acceleration of the device is periodic such that if the acceleration of the device is not periodic, comparing the integral of the acceleration with a first critical value so as to determine whether the device falls freely, and if the acceleration of the device is periodic, comparing the integral of the acceleration with a second critical value differing from the first critical value so as to determine whether the device falls freely.

The determining of whether the acceleration of the device is periodic may include measuring time intervals of periods of the acceleration, and if a difference between the time intervals is within a predetermined error range, determining that the acceleration is periodic.

The determining of whether the acceleration of the device is periodic may include measuring a time interval between two time points in a period of the acceleration at which the acceleration has a same predetermined value, and comparing the time interval with an interval critical value so as to determine whether the acceleration is periodic.

The determining of whether the acceleration of the device is periodic may include measuring a frequency of occurrence of a frequency of the acceleration, and comparing the frequency of occurrence with a reference frequency of occurrence so as to determine whether the acceleration is periodic.

The calculating of the integral of the acceleration may be performed if the acceleration may be less than a predetermined acceleration critical value.

If the acceleration of the device may be periodic, the method may further include setting the second critical value to be greater than the first critical value.

The comparing of the integral of the acceleration with the first critical value may include generating a free fall alarm signal if the integral of the acceleration is greater than the first critical value.

The comparing of the integral of the acceleration with the second critical value may include generating a free fall alarm signal if the integral of the acceleration is greater than the second critical value.

The foregoing and/or other aspects and utilities of the general inventive concept may also be achieved by providing a free fall detecting apparatus including an acceleration sensor to measure an acceleration of a device, an integrator to calculate an integral of the acceleration of the device, and a free fall determination unit to determine whether the acceleration of the device is periodic such that if the free fall determination unit determines that the acceleration of the device is not periodic, the free fall determination unit compares the integral of the acceleration with a first critical value so as to determine whether the device falls freely, and if the free fall determination unit determines the acceleration of the device is periodic, the free fall determination unit compares the integral of the acceleration with a second critical value so as to determine whether the device falls freely, wherein the second critical value differs from the first critical value.

The foregoing and/or other aspects and utilities of the general inventive concept may also be achieved by providing a computer-readable recording medium having embodied thereon a computer program to execute a method, wherein the method including measuring an acceleration of a device, determining whether the acceleration of the device is periodic, and comparing an integral of the acceleration with one of a first critical value and a second critical value based on whether the acceleration of the device is periodic to determine whether the device falls freely.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE EMBODIMENTS

Figure 1:
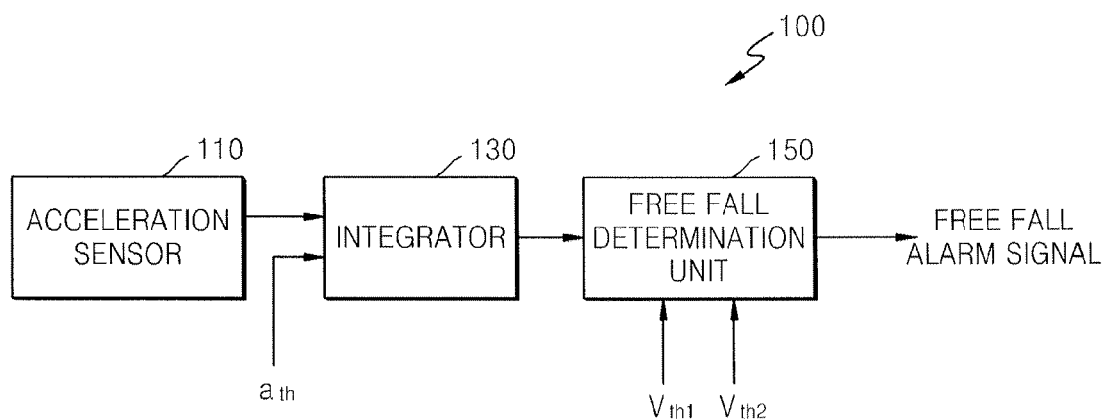
FIG. 1 is a block diagram illustrating a free fall detecting apparatus according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a free fall detecting apparatus 100 according to an embodiment of the present general inventive concept. Referring to FIG. 1, the free fall detecting apparatus 100 may include an acceleration sensor 110, an integrator 130, and a free fall determination unit 150. The acceleration sensor 110 measures acceleration of a device. The integrator 130 calculates an integral of a signal output from the acceleration sensor 110. For example, the integrator 130 integrates acceleration of a device detected by the acceleration sensor 110 with respect to time when the detected acceleration is lower than a predetermined acceleration critical value $a_{th}$. The acceleration critical value $a_{th}$ can be 0.5 g (g denotes gravitational gravity). However, the acceleration critical value $a_{th}$ is not limited to 0.5 g. It will be apparent to one of ordinary skill in the art that the acceleration critical value $a_{th}$ can vary.

The time for which the acceleration is integrated can be determined according to a characteristic of the device. It is also possible that the time can be set in a manufacturing process of manufacturing the device or can be adjusted by a user through an input unit connected to the integrator 130 to generate an adjusting signal to adjust the time.

It is also possible that the time is a period to repeat the integration of the acceleration. In this case, another period can be set between the times, such that the acceleration can be periodically integrated according to the periods and the another period.

The free fall determination unit 150 determines whether the detected acceleration varies periodically. If the acceleration is not periodic, the free fall determination unit 150 compares the integral of the acceleration with a first critical value $V_{th1}$ to determine whether the device falls freely. In detail, if the integral of the acceleration is greater than the first critical value $V_{th1}$, the free fall determination unit 150 generates a free fall alarm signal, and if the integral of the acceleration is not greater than the first critical value $V_{th1}$, the free fall determination unit 150 does not generate a free fall alarm signal.

Meanwhile, if the acceleration is periodic, the free fall determination unit 150 compares the integral of the acceleration with a second critical value $V_{th2}$ to determine whether the device falls freely. In detail, if the integral of the acceleration is greater than the second critical value $V_{th2}$, the free fall determination unit 150 generates a free fall alarm signal, and if the integral of the acceleration is not greater than the second critical value $V_{th2}$, the free fall determination unit 150 does not generate a free fall alarm signal. The second critical value $V_{th2}$ differs from the first critical value $V_{th1}$. The second critical value $V_{th2}$ may be greater than the first critical value $V_{th1}$.

Figure 2:
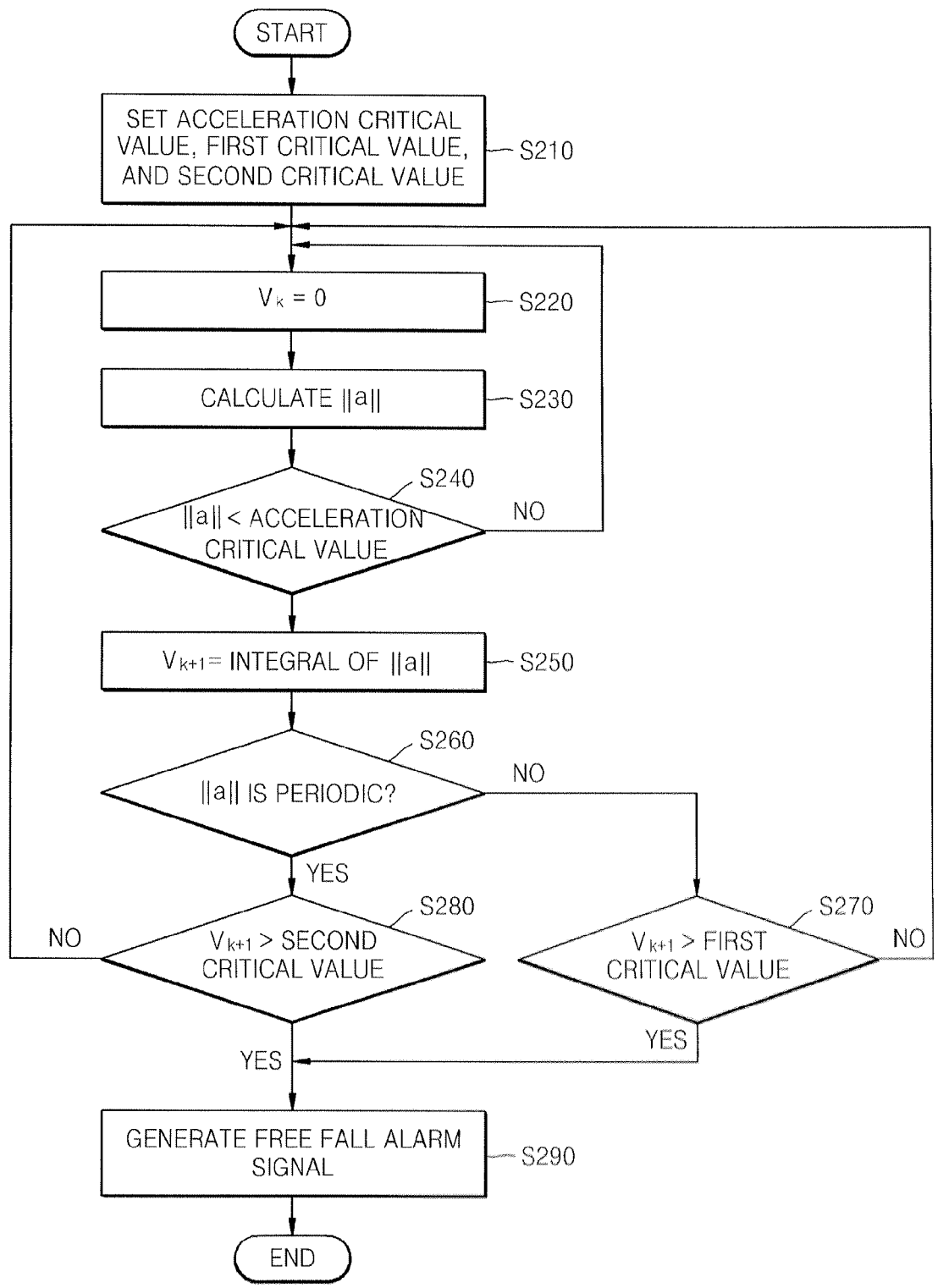
FIG. 2 is a flowchart illustrating a method of detecting free fall using the free fall detecting apparatus depicted in FIG. 1, according to an embodiment of the present general inventive concept.

FIG. 2 is a flowchart illustrating a method of detecting free fall using the free fall detecting apparatus 100 according to an embodiment of the present general inventive concept.

Referring to FIGS. 1 and 2, in operation S210, an acceleration critical value $a_{th}$, a first critical value $V_{th1}$, and a second critical value $V_{th2}$ are set. In operation S220, a temporary variable $V_K$ is initialized to zero. The acceleration critical value $a_{th}$, the first critical value $V_{th1}$, and the second critical value $V_{th2}$ may be determined according to characteristics of a target device or may be adjusted by the user through the input unit connected to the integrator 130 and the free fall determination unit 150, requested. In operation S230, the acceleration sensor 110 measures an acceleration of the device to obtain an acceleration vector and calculates the magnitude $\|a\|$ of the acceleration vector. The magnitude $\|a\|$ can be calculated using a square-root operation or a simple adding operation. The calculation of the magnitude $\|a\|$ will be apparent to one of ordinary skill in the art. Thus, a detailed description of the calculation of the magnitude $\|a\|$ will be omitted. In operation S240, a determination is made whether the magnitude $\|a\|$ is smaller than the acceleration critical value $a_{th}$. If the magnitude $\|a\|$ is smaller than the acceleration critical value $a_{th}$, the integrator 130 calculates the integral of the magnitude $\|a\|$ of the acceleration vector and stores the calculation result in a temporary variable $V_{K+1}$ where k denotes the order of integral calculation in operation S250. If the magnitude $\|a\|$ is not smaller than the acceleration critical value $a_{th}$, the method goes back to operation S220 to initialize the temporary variable $V_K$ to zero.

In operation S260, the free fall determination unit 150 determines whether the magnitude $a\|$ of the acceleration vector is periodic. A method of determining whether the magnitude $\|a$ of the acceleration vector is periodic will be described later in detail with reference to FIGS. 4 through 6. If a determination is made that the magnitude $\|a\|$ of the acceleration vector is not periodic, the free fall determination unit 150 compares the temporary variable $V_{K+1}$ with the first critical value $V_{th1}$ in operation S270. If the temporary variable $V_{K+1}$ is greater than the first critical value $V_{th1}$, the free fall determination unit 150 generates a free fall alarm signal in operation S290. If the temporary variable $V_{K+1}$ is not greater than the first critical value $V_{th1}$, the method goes back to operation S220 to initialize the temporary variable $V_K$ to zero.

Meanwhile, if a determination is made in operation S260 that the magnitude ‖a‖ of the acceleration vector is periodic, the free fall determination unit 150 compares the temporary variable $V_{K+1}$ with the second critical value $V_{th2}$ in operation S280. If the temporary variable $V_{K+1}$ is greater than the second critical value $V_{th2}$, the free fall determination unit 150 generates a free fall alarm signal in operation S290. If the temporary variable $V_{K+1}$ is not greater than the second critical value $V_{th2}$, the method goes back to operation S220 to initialize the temporary variable $V_K$ to zero.

In the current embodiment, when a device is periodically accelerated, whether the device falls freely is determined using the second critical value $V_{th2}$ instead of using the first critical value $V_{th1}$. Therefore, the free fall state of the device can be detected more exactly, and thus a possibility of malfunction of the device caused by inexact free-fall detection can be reduced.

Figure 3:
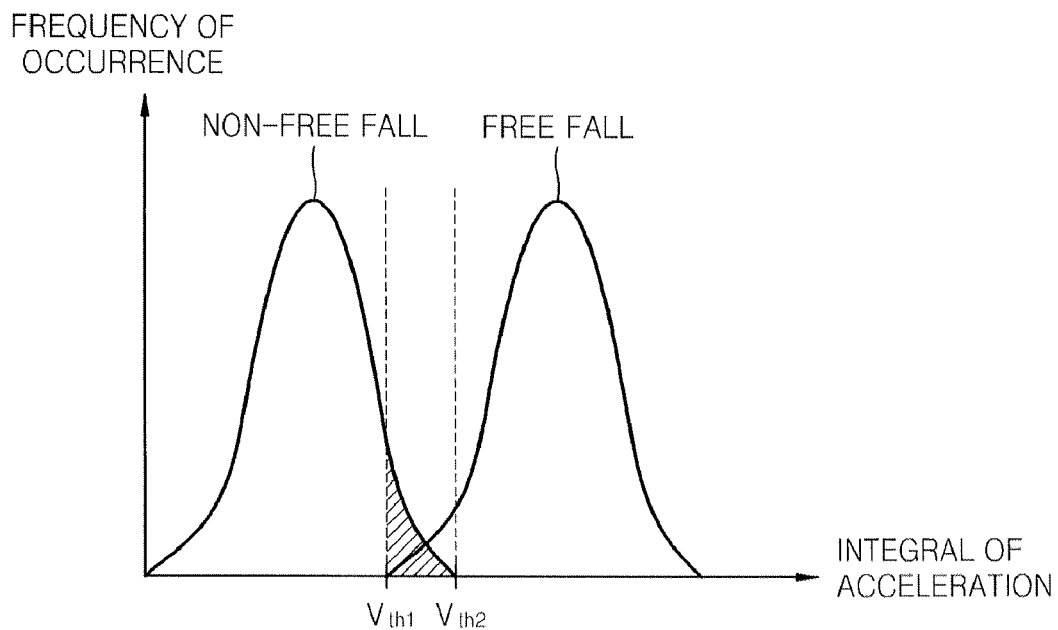
FIG. 3 is a graph illustrating a method of determining free fall based on first and second critical values according to an embodiment of the present general inventive concept.

FIG. 3 is a graph illustrating a method of determining free fall based on first and second critical values $V_{th1}$ and $V_{th2}$ according to an embodiment of the present general inventive concept.

Referring to FIG. 3, in the case of free fall, the integral of the acceleration of a device has the maximal frequency of occurrence at a relatively high value. In the case of non-free fall, the integral of the acceleration of the device has the maximal frequency of occurrence at a relatively low value. If whether the device falling freely is determined using the first critical value $V_{th1}$ the device falls freely when the integral of the acceleration of the device ranges within the dashed-line region can be erroneously concluded. Therefore, in the current embodiment, when a detection is made that the acceleration of the device is periodic, whether the device falls freely is determined using the second critical value $V_{th2}$ instead of using the first critical value $V_{th1}$. Thus, when the integral of the acceleration of the device ranges within the dashed-region, the device is determined to be in a non-free fall state.

Figure 4:
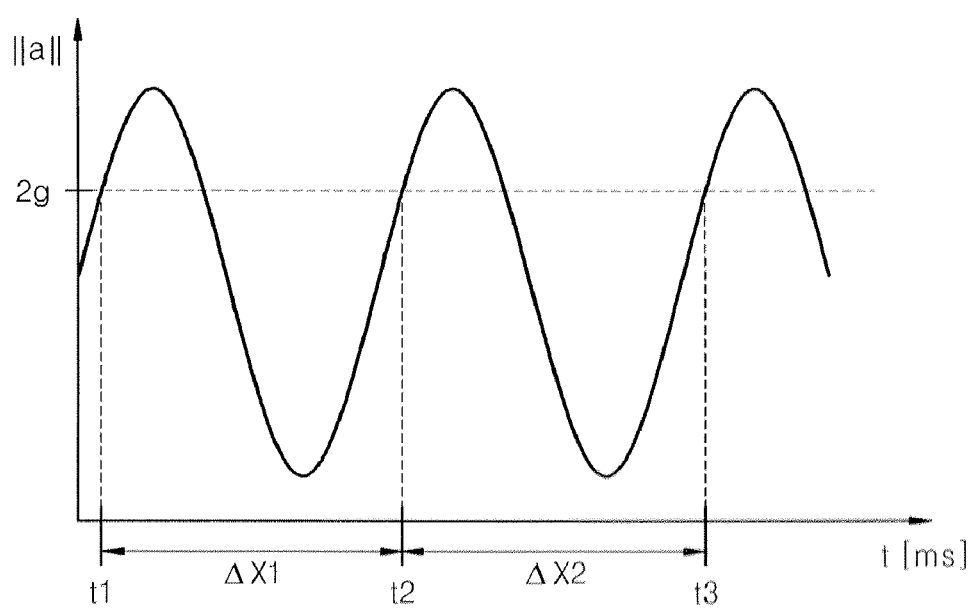
FIG. 4 is a graph illustrating a method of determining whether acceleration varies periodically according to an embodiment of the present general inventive concept.

FIG. 4 is a graph illustrating a method of determining whether acceleration varies periodically according to an embodiment of the present general inventive concept.

Referring to FIGS. 2 and 4, whether an acceleration vector is periodic can be determined by measuring time intervals of periods of an acceleration vector and comparing differences between the time intervals. For example, as illustrated in FIG. 4, time intervals of periods of the acceleration vector can be measured based on 2 g. In the first period, the magnitude ‖a‖ of the acceleration vector is 2 g at time points t1 and t2. That is, the time interval of the first period of the acceleration vector is ΔX1. In the second period, the magnitude ‖a‖ of the acceleration vector is 2 g at time points t2 and t3. That is, the time interval of the second period of the acceleration vector is ΔX2. Whether the acceleration vector is periodic can be determined from the two time intervals ΔX1 and A2. If the difference between the time intervals ΔX1 and ΔX2 is within a predetermined error range, a determination is made that the acceleration vector is periodic. If the difference between the time intervals ΔX1 and ΔX2 is outside the predetermined error range, a determination is made that the acceleration vector is not periodic. That is, when a determination is made that the acceleration vector is periodic since the difference between the time intervals ΔX1 and ΔX2 is within the predetermined error range, the integral of the acceleration vector is compared with the second critical value $V_{th2}$ to determine whether a device falls freely. In the embodiment illustrated in FIG. 4, the time intervals of the periods of the acceleration vector are measured based on 2 g. However, the time intervals can be measured based on other values, which will be apparent to one of ordinary skill in the art. In addition, in the embodiment of FIG. 4, whether the acceleration vector is periodic is determined by comparing two time intervals. However, whether the acceleration vector is periodic can be determined more precisely by comparing three or more time intervals, which will be apparent to one of ordinary skill in the art.

Figure 5:
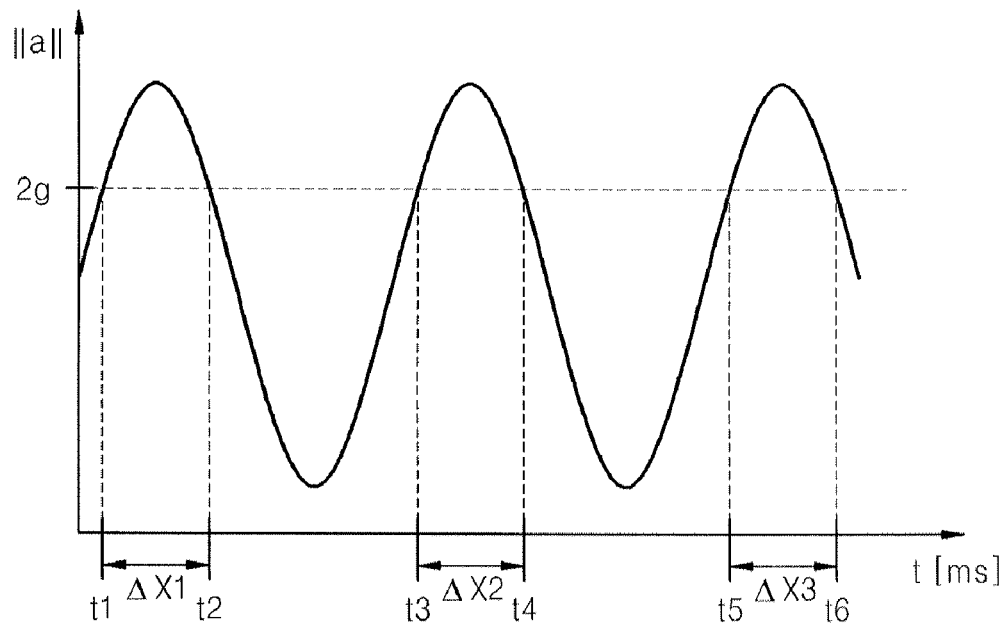
FIG. 5 is a graph illustrating a method of determining whether acceleration varies periodically according to another embodiment of the present general inventive concept.

FIG. 5 is a graph illustrating a method of determining whether acceleration of a device varies periodically according to another embodiment of the present general inventive concept.

Figure 6:
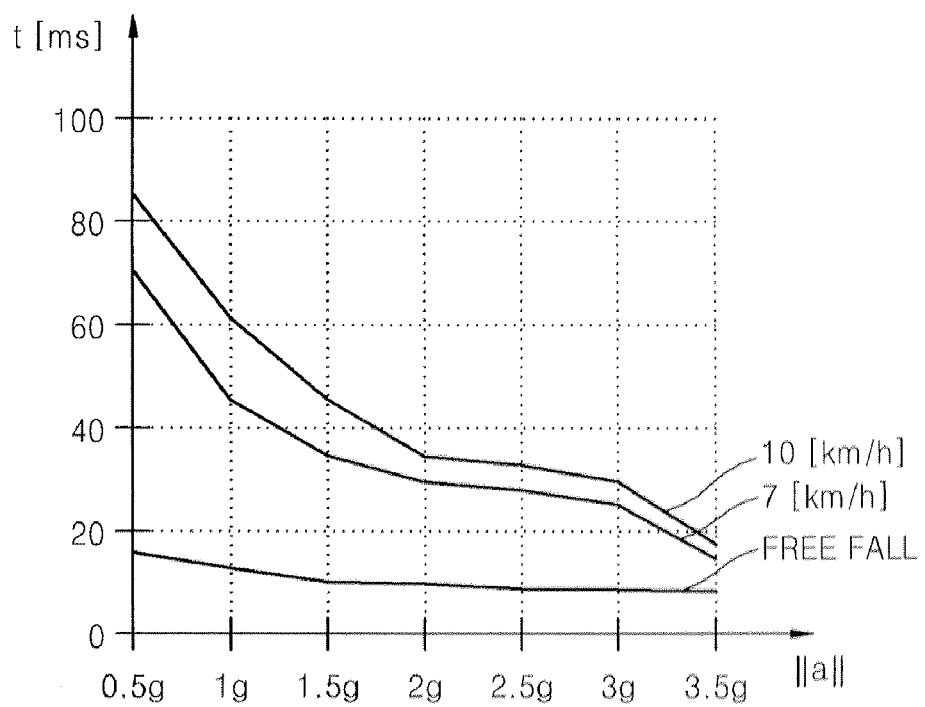
FIG. 6 is a graph illustrating a relationship between time interval and acceleration for the cases of free falling such as 7-km/h moving state and a 10-km/h moving state.

FIG. 6 is a graph illustrating a relationship between time interval and acceleration for the cases where a device is in a free-fall state such as a 7-km/h moving state and a 10-km/h moving state.

Referring to FIGS. 2, 5, and 6, a time interval is measured between two time points in a period of an acceleration vector of a device at which the magnitude ‖a‖ of the acceleration vector has a same predetermined value, and the time interval is compared with an interval critical value so as to determine whether the acceleration vector of the device is periodic. For example, as illustrated in FIG. 5, time intervals are measured between time points of periods of the acceleration vector where the magnitude ‖a‖ of the acceleration vector is 2 g. In the first period, the magnitude ‖a‖ of the acceleration vector is 2 g at time points t1 and t2, and the time interval between the time points t1 and t2 is ΔX1. The time interval ΔX1 is compared with the interval critical value to determine whether the acceleration vector of the device is periodic. In the second period, the magnitude ‖a‖ of the acceleration vector is 2 g at time points t3 and t4, and the time interval between the time points t3 and t4 is ΔX2. The time interval ΔX2 is compared with the interval critical value to determine whether the acceleration vector of the device is periodic. In the third period, the magnitude ‖a‖ of the acceleration vector is 2 g at time points t5 and t6, and the time interval between the time points t5 and t6 is ΔX3. The time interval ΔX3 is compared with the interval critical value to determine the acceleration vector of the device is periodic.

Referring to FIG. 6, the interval critical value can be set to 20 ms for the case where the time interval is measured based on 2 g as illustrated in FIG. 5. In detail, the time interval between time points where the magnitude ‖a‖ of the acceleration vector of the device is 2 g is approximately 10 ms for the case where the device falls freely, and approximately 30 ms to 40 ms for the cases where the device moves at 7 km/h and 10 km/h under a periodic acceleration condition. For example, if the acceleration vector illustrated in FIG. 5 is measured when the device moves at 7 km/h, the time interval ΔX1 measured based on 2 g may be approximately 30 ms. That is, the interval critical value can be set to 20 ms when the time interval ΔX1 is measured based on 2 g. If the time interval ΔX1 is greater than 20 ms (interval critical value), a determination is made that the acceleration of the device is periodic, and if the time interval ΔX1 is not greater than 20 ms, a determination is made that the acceleration of the device is not periodic.

Like in the FIG. 4, time intervals of the acceleration vector are measured based on 2 g in FIG. 5. However, the time intervals of the acceleration vector can be measured based on other values, which will be apparent to one of ordinary skill in the art.

Figure 7:
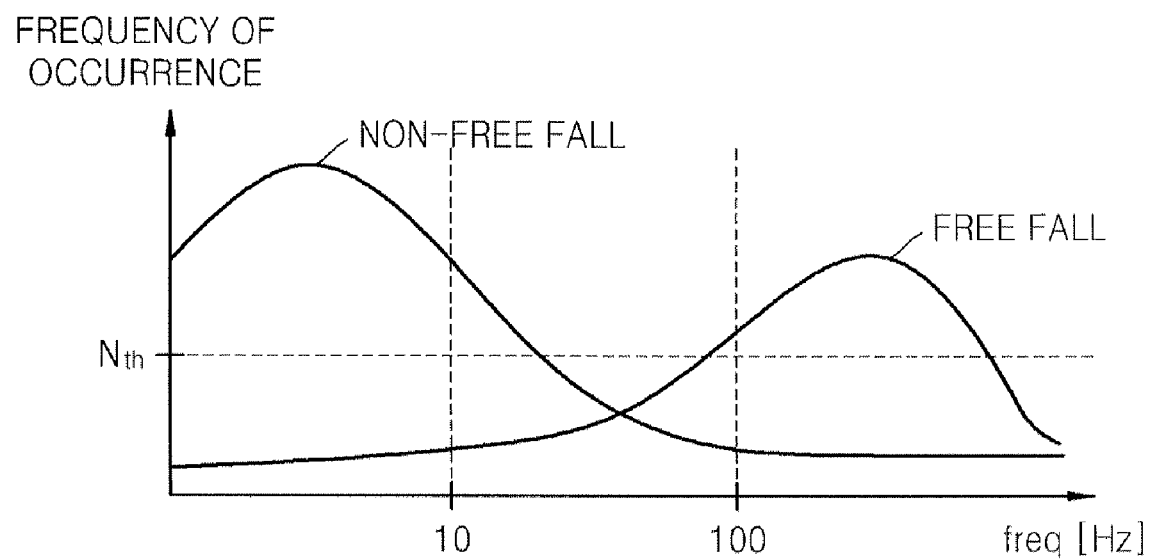
FIG. 7 is a graph illustrating a method of determining whether acceleration varies periodically according to another embodiment of the present general inventive concept.

FIG. 7 is a graph illustrating a method of determining whether acceleration of a device varies periodically according to another embodiment of the present general inventive concept.

Referring to FIGS. 2 and 7, whether the acceleration of the device is periodic can be determined based on the frequency of the acceleration of the device. FIG. 7 illustrates a relationship between frequency of occurrence and frequency of acceleration of the device. Referring to FIG. 7, In the case of non-free fall, the frequency of the acceleration of the device is concentrated at a low frequency region. In the case of free fall, the frequency of the acceleration of the device is concentrated at a high frequency region. For example, the frequency of occurrence of the acceleration of the device at 10 Hz is greater than a reference frequency of occurrence $N_{th}$ when the device is in a non-free fall state but smaller than the reference frequency of occurrence $N_{th}$ when the device is in a free fall state. That is, when the frequency of the acceleration of the device is 10 Hz, whether the acceleration of the device is periodic can be determined by comparing the frequency of occurrence of the acceleration of the device at 10 Hz with the reference frequency of occurrence.

For example, the frequency of occurrence of the acceleration of the device at 100 Hz is smaller than the reference frequency of occurrence $N_{th}$ when the device is in a non-free fall state but greater than the reference frequency of occurrence $N_{th}$ when the device is in a free fall state. That is, when the frequency of the acceleration of the device is 100 Hz, whether the acceleration of the device is periodic can be determined by comparing the frequency of occurrence of the acceleration of the device at 100 Hz with the reference frequency of occurrence $N_{th}$. Although the method of FIG. 7 is explained for the cases where the frequency of the acceleration of the device is 10 Hz and 100 Hz, the method can be used in the same way for other frequencies. In addition, the reference frequency of occurrence $N_{th}$ can be varied. These will be apparent to one of ordinary skill in the art.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to the method of detecting a free fall of a device and the apparatus to detect the free fall using the method, the free fall of the device can be correctly detected since whether the device is periodically accelerated is considered. Therefore, malfunction of the device caused by incorrect free-fall detection can be prevented. For example, an unnecessary protection operation for a hard disk drive of the device can be prevented, and thus a user can conveniently use the device.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of detecting a free fall of a device, the method comprising:
   measuring an acceleration of the device with an acceleration sensor;
   calculating an integral of the acceleration of the device with respect to time with an integrator; and
   determining with a free-fall determination apparatus whether the acceleration of the device is periodic such that:
       if the acceleration of the device is not periodic, comparing the integral of the acceleration with a first critical value so as to determine whether the device falls freely; and
       if the acceleration of the device is periodic, comparing the integral of the acceleration with a second critical value differing from the first critical value so as to determine whether the device falls freely.

2. The method of claim 1, wherein the determining of whether the acceleration of the device is periodic comprises:
   measuring time intervals of periods of the acceleration with the free-fall determination apparatus; and
   if a difference between the time intervals is within a predetermined error range, determining with the free-fall determination apparatus that the acceleration is periodic.

3. The method of claim 1, wherein the determining of whether the acceleration of the device is periodic comprises:
   measuring a time interval with the free-fall determination apparatus between two time points in a period of the acceleration at which the acceleration has a same predetermined value; and
   comparing with the free-fall determination apparatus the time interval with an interval critical value so as to determine whether the acceleration is periodic.

4. The method of claim 1, wherein the determining of whether the acceleration of the device is periodic comprises:
   measuring a frequency of occurrence of a frequency of the acceleration with the free-fall determination apparatus; and
   comparing the frequency of occurrence with a reference frequency of occurrence with the free-fall determination apparatus so as to determine whether the acceleration is periodic.

5. The method of claim 1, wherein the calculating of the integral of the acceleration is performed by the integrator if the acceleration is less than a predetermined acceleration critical value.

6. The method of claim 1, wherein if the acceleration of the device is periodic, the method further comprises:
   setting the second critical value to be greater than the first critical value with the free-fall determination apparatus.

7. The method of claim 1, wherein the comparing of the integral of the acceleration with the first critical value comprises:
   generating a free fall alarm signal with the free-fall determination apparatus if the integral of the acceleration is greater than the first critical value.

8. The method of claim 1, wherein the comparing of the integral of the acceleration with the second critical value comprises:

generating a free fall alarm signal with the free-fall determination apparatus if the integral of the acceleration is greater than the second critical value.

9. A free fall detecting apparatus, comprising:
an acceleration sensor to measure an acceleration of a device;
an integrator to calculate an integral of the acceleration of the device; and
a free fall determination unit to determine whether the acceleration of the device is periodic such that:
if the free fall determination unit determines that the acceleration of the device is not periodic, the free fall determination unit compares the integral of the acceleration with a first critical value so as to determine whether the device falls freely; and
if the free fall determination unit determines the acceleration of the device is periodic, the free fall determination unit compares the integral of the acceleration with a second critical value so as to determine whether the device falls freely,
wherein the second critical value differs from the first critical value.

10. The free fall detecting apparatus of claim 9, wherein the free fall determination unit measures time intervals of periods of the acceleration and determines that the acceleration is periodic if a difference between the time intervals is within a predetermined error range.

11. The free fall detecting apparatus of claim 9, wherein the free fall determination unit measures a time interval between two time points in a period of the acceleration at which the acceleration has a same predetermined value and compares the time interval with an interval critical value so as to determine whether the acceleration is periodic.

12. The free fall detecting apparatus of claim 9, wherein the free fall determination unit measures a frequency of occurrence of a frequency of the acceleration and compares the frequency of occurrence with a reference frequency of occurrence so as to determine whether the acceleration is periodic.

13. The free fall detecting apparatus of claim 9, wherein the integrator calculates the integral of the acceleration if the acceleration is less than a predetermined acceleration critical value.

14. The free fall detecting apparatus of claim 9, wherein the second critical value is greater than the first critical value.

15. The free fall detecting apparatus of claim 9, wherein the free fall determination unit generates a free fall alarm signal if the integral of the acceleration is greater than the first critical value.

16. The free fall detecting apparatus of claim 9, wherein the free fall determination unit generates a free fall alarm signal if the integral of the acceleration is greater than the second critical value.

17. A non-transitory computer-readable medium containing computer readable instructions stored therein for causing a computer processor to perform a method, wherein the method comprises:
measuring an acceleration of a device;
determining whether the acceleration of the device is periodic; and
comparing an integral of the acceleration with one of a first critical value and a second critical value based on whether the acceleration of the device is periodic to determine whether the device falls freely.

* * * * *